United States Patent
Ma et al.

(10) Patent No.: US 12,103,187 B2
(45) Date of Patent: Oct. 1, 2024

(54) PATH PLANNING METHOD AND BIPED ROBOT USING THE SAME

(71) Applicant: UBTECH ROBOTICS CORP LTD, Shenzhen (CN)

(72) Inventors: Xingxing Ma, Shenzhen (CN); Chunyu Chen, Shenzhen (CN); Ligang Ge, Shenzhen (CN); Yizhang Liu, Shenzhen (CN); Hongge Wang, Shenzhen (CN); Jie Bai, Shenzhen (CN); Zheng Xie, Shenzhen (CN); Jiangchen Zhou, Shenzhen (CN); Meihui Zhang, Shenzhen (CN); Shuo Zhang, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 330 days.

(21) Appl. No.: 17/516,729

(22) Filed: Nov. 2, 2021

(65) Prior Publication Data

US 2022/0203534 A1    Jun. 30, 2022

(30) Foreign Application Priority Data

Dec. 29, 2020   (CN) .......................... 202011598911.0

(51) Int. Cl.
  *B25J 9/16*   (2006.01)
  *B62D 57/032*  (2006.01)
  (Continued)

(52) U.S. Cl.
  CPC .......... *B25J 9/1666* (2013.01); *B62D 57/032* (2013.01); *G05D 1/43* (2024.01); *G05D 1/637* (2024.01);
  (Continued)

(58) Field of Classification Search
  CPC .................. B25J 9/1664; B25J 9/1666; G05D 1/021–0217; G05D 1/0274; G05D 1/12;
  (Continued)

(56) References Cited

U.S. PATENT DOCUMENTS

2019/0204848 A1\* 7/2019 Xiong ...................... B25J 13/08
2023/0107084 A1    4/2023 Chen et al.

FOREIGN PATENT DOCUMENTS

CN    110806218 A      2/2020
CN    111174798 A      5/2020
CN    111830986 A  \*  10/2020  ........... G05D 1/0217

OTHER PUBLICATIONS

ISR for PCT/CN2021/132993.
Written opinions of ISA for PCT/CN2021/132993.

\* cited by examiner

*Primary Examiner* — Spencer D Patton

(57) ABSTRACT

A path planning method and a biped robot using the same are provided. The method includes: generating a candidate node set for a next foot placement based on a biped robot's own parameters and joint information of a current node, adding valid candidate nodes in the candidate node set to a priority queue so as to select optimal nodes for realizing next node expansion. These optimal nodes are output to generate a foot placement sequence from an initial node to a target node, which can greatly reduce the search amount for path nodes when the robot's legs intersect and touch the ground, thereby improving the efficiency of path planning.

18 Claims, 9 Drawing Sheets

(51) Int. Cl.
  *G05D 1/43* (2024.01)
  *G05D 1/622* (2024.01)
  *G05D 1/644* (2024.01)
  *G05D 109/12* (2024.01)
(52) U.S. Cl.
  CPC ......... *G05D 1/644* (2024.01); *G05D 2109/12* (2024.01)
(58) Field of Classification Search
  CPC ..... G05D 2201/02–0218; G05D 1/622; G05D 1/637; G05D 2109/12; G05D 1/43; G05D 1/644; B62D 57/032; G01C 21/34; G01C 21/3446; G01C 21/3453
  See application file for complete search history.

PATH PLANNING METHOD AND BIPED ROBOT USING THE SAME

CROSS REFERENCE TO RELATED APPLICATIONS

The present disclosure claims priority to Chinese Patent Application No. 202011598911.0, Dec. 29, 2020, which is hereby incorporated by reference herein as if set forth in its entirety.

BACKGROUND

1. Technical Field

The present disclosure relates to robot navigation technology, and particularly to a path planning method and a biped robot using the same.

2. Description of Related Art

For a wheeled robot, the navigation is usually realized by tracking the trajectory of the centroid (center of mass) of the wheeled robot. During path planning, the wheeled robot is usually regarded as a point, and the obstacles in the map can be expanded according to the lateral size of the robot so as to realize the selection of the obstacle avoided route. However, for a biped robot with left and right legs, it needs to realize the navigation by planning the foot placements of the left and right legs that intersect to each other. Therefore, the existing wheeled robot planning methods are not suitable for biped robots.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

Figure 1:
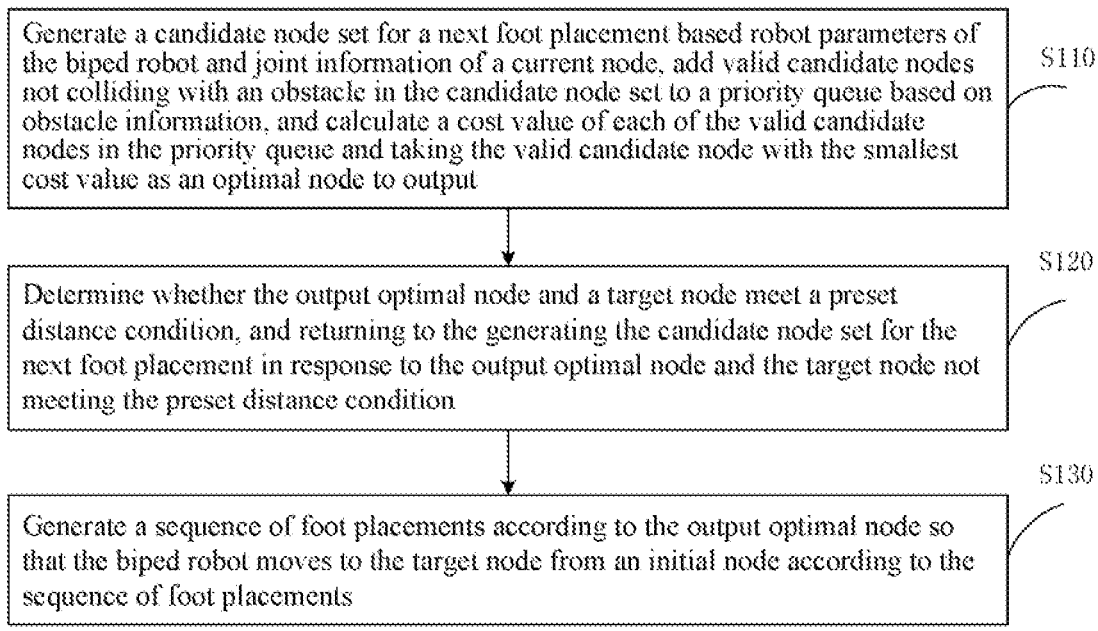
FIG. 1 is a flow chart of the first embodiment of a biped robot path planning method according to the present disclosure.

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

Generally, the components of the embodiments of the present disclosure described and illustrated in the drawings herein may be arranged and designed in various configurations. Therefore, the following detailed description of the embodiments of the present disclosure provided in the drawings is not intended to limit the scope of the protected invention, but merely represents the selected embodiments of the present disclosure. Based on the embodiments of the present disclosure, all other embodiments obtained by those skilled in the art without creative work shall fall within the protection scope of the present disclosure.

For the existing wheeled robot, unmanned car, or the like, when navigating in a map, a path planning algorithm such as the A* search algorithm and the A* based search algorithm is generally used. In which, the A* search algorithm is a relatively effective direct search algorithm for solving the shortest path in a static map. For the applications scenes such as wheeled robot navigation or car navigation, since this type of object can be regarded as the movement of a centroid, when searching for the path node (hereinafter referred to as the node) on the map, it only needs to search for sub-nodes in the neighboring nodes around the current node. Generally, in order to accurately describe the location information such as the location of obstacles in the map, a square grid or the like can be used as the smallest unit of the map for description, where the center of each square grid can be regarded as each node in the map. It can be seen that, for the above-mentioned case that the graph search is only performed on the surrounding nodes of the current node, the calculation amount of searching is relatively small.

However, for a biped robot, since its supporting leg and swinging leg can walk across the nodes on the map, the search range of its nodes will no longer be limited to the surrounding nodes when using the A* search algorithm for path planning. That is, the search amount at this time will be greatly increased, which means that the calculation amount will increase sharply and will cause the great reducing of the search speed. Especially for the biped robots with high real-time requirements, the use of the A* search algorithm in biped robots will be greatly restricted.

For this reason, in the embodiments of the present disclosure, a biped robot path planning method is proposed. The extended search of the next node is performed by combining a biped robot's own parameters and real-time motion information, thereby greatly reducing the number of nodes to be extended, and greatly improving the search efficiency and planning speed. A detailed description will be given below in conjunction with specific embodiments.

Embodiment 1

FIG. 1 is a flow chart of the first embodiment of a biped robot path planning method according to the present disclosure. A path planning method is provided. In one embodiment, the path planning method is a computer-implemented method executable for a processor, which may be applied to the above-mentioned biped robot. The method may be implemented through a biped robot path planning apparatus shown in FIG. 9. The method performs sub-node searching on the nodes on the path in order according to the footprint set of the biped robot, which not only can realize the path planning for the biped robot from the starting point to the end point, but also performs sub-node expansion by combining the footprint set generated based on the biped robot's own parameters and joint information of the two legs, and can greatly reduce the search amount for nodes.

In this embodiment, before performing the following step S110, the method may further include:

receiving navigation information, where the navigation information includes a global map for the biped robot, and the global map includes the obstacle information and the designated initial node and target node.

Generally, when the biped robot receives the navigation information, the global map and the location information of the initial node (i.e., the starting point), the target node (i.e., the end point), and the obstacles in the map may be extracted from the navigation information. The biped robot may further perform path searching based on the global map and the location information of the initial node, target node, and obstacles in the map.

In one embodiment, if the scene where the biped robot is navigated is relatively fixed, for example, navigated in warehouses, shopping malls, and the like, the above-mentioned global map including obstacle information may be stored in the storage (e.g., the memory) of the robot in advance, and the initial node and the target node may be set according to the actual scene.

Figure 2:
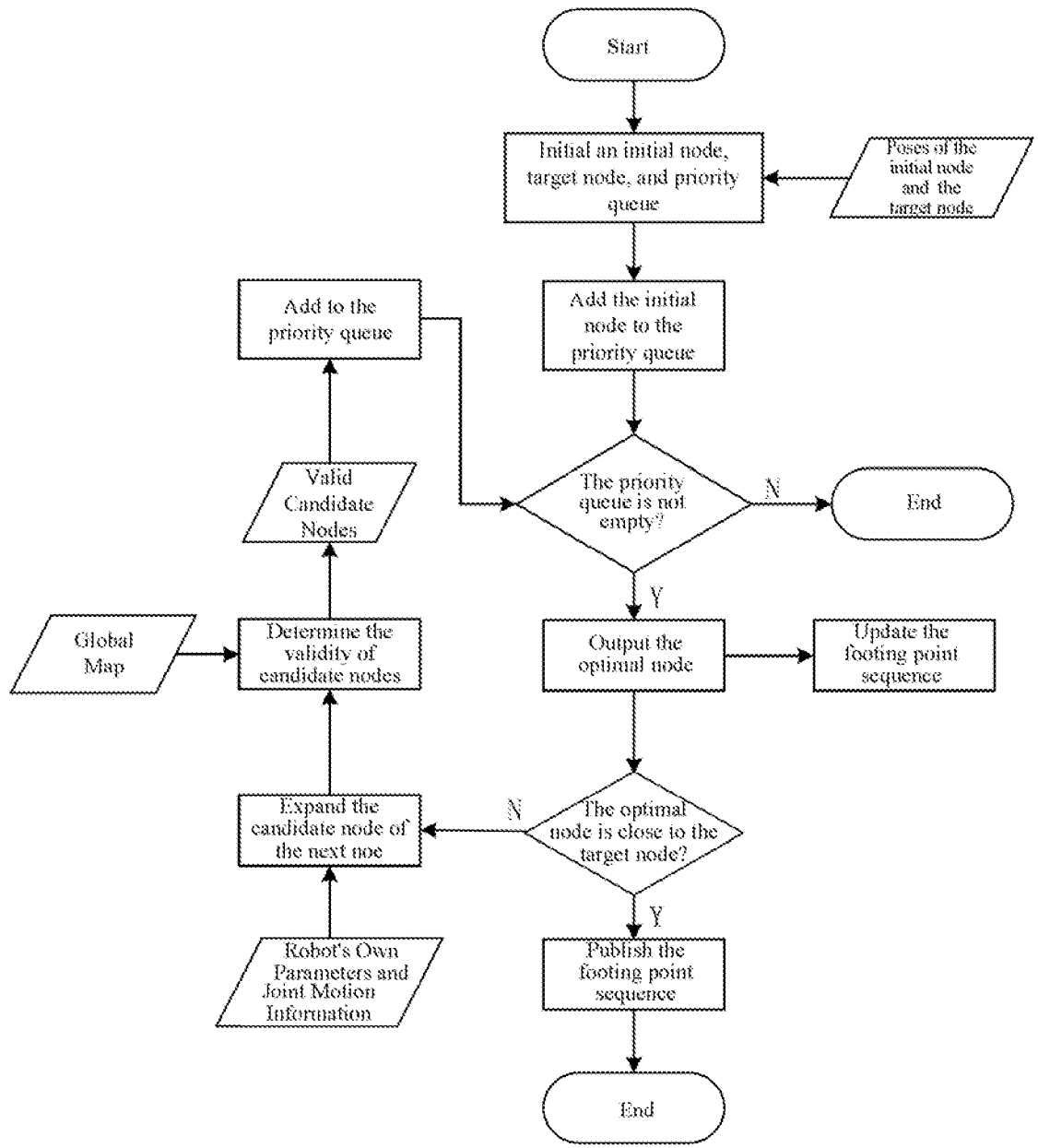
FIG. 2 is a flow chart of the second embodiment of a biped robot path planning method according to the present disclosure.

FIG. 2 is a flow chart of the second embodiment of a biped robot path planning method according to the present disclosure. As shown in FIG. 2, the biped robot may initialize the initial node and the target node according to the position of the initial node and the posture of the biped robot at the initial node (i.e., the pose at the initial node) and the pose at the target node. A priority queue and a cost evaluation function are also created to search the nodes on the path. It can be understood that, the node on the path is a data structure that contains the position and angle (abbreviated as the pose information) of the biped robot and the cost value of the node when its leg touches the ground. The priority queue is a data structure that uses the created cost evaluation function to calculate the cost value of the nodes in the priority queue and sort from small to large according to the cost value.

In which, the above-mentioned cost evaluation function is for calculating the cost value of the current candidate node when it is used as the next foot placement of the biped robot in the global map. In one embodiment, the cost evaluation function F may be express as F(i)=H(i)+G(i), where H(i) and G(i) represent the heuristic value and the spent cost value of the i-th candidate node, respectively. The heuristic value refers to the predicted cost from the current candidate node to the target node, and the spent cost value refers to the spent cost from the initial node to the current candidate node.

Generally, in this embodiment, after receiving the above-mentioned navigation information and creating the priority queue, the initial node will be added to the priority queue as the first candidate node first. At this time, because the priority queue only includes the first candidate node, the initial node in the priority queue may be directly output to take as the initial foot placement of the biped robot.

Since the initial node used as the initial foot placement is far away from the target node, after starting from the initial node and before reaching the target node, it will be necessary to search for the next node of the current node in turn.

As shown in FIG. 1, in this embodiment, the method may include the following steps.

S110: generating a candidate node set for a next foot placement based robot parameter(s) of the biped robot and joint information of a current node, adding one or more valid candidate nodes not colliding with an obstacle in the candidate node set to a priority queue based on obstacle information, and calculating a cost value of each of the valid candidate nodes in the priority queue and taking the valid candidate node with the smallest cost value as an optimal node to output.

As an example, starting from the initial node, for the searching of the candidate node of the initial node and its subsequent nodes, the candidate node set (also known as the footprint set) (see FIG. 3) of the next foot placement may be calculated through the kinematics and dynamics of the biped robot based on the joint information of the biped robot at the current node and the robot parameter(s)(e.g., foot size) of the biped robot. Generally, the footprint set includes a plurality of footprints that can be reached by the current swinging leg of the biped robot. Each footprint corresponds to a node in the map. Since the next foot placement will be selected from these nodes in the map, each footprint in the footprint set is the candidate node for the next foot placement.

Figure 3:
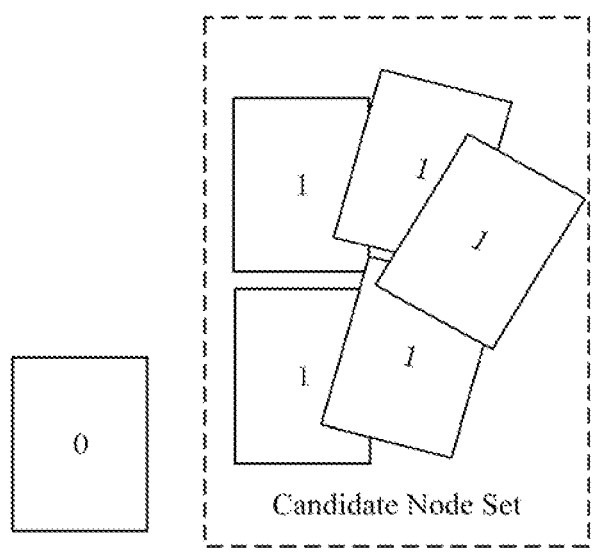
FIG. 3 is a schematic diagram of an example of a footprint set in the biped robot path planning method of FIG. 1.

FIG. 3 is a schematic diagram of an example of a footprint set in the biped robot path planning method of FIG. 1. When the left leg of the biped robot is currently used as the supporting leg to touch the ground, as shown in FIG. 3, as an example, 0 represents the left leg taken as the supporting leg, and 1 represents the right leg taken as the swing leg, the candidate nodes that the right leg 1 can reach may be calculated based on each joint information and the robot parameter(s) of the biped robot, and the collection of these candidate nodes is the above-mentioned candidate node set.

In which, the above-mentioned robot parameter (i.e., the biped robot's own parameter) may include, but are not limited to, the length of each link (e.g., leg) of the biped robot. For example, the length of a link (e.g., the foot size) may be used as a limit for the maximum distance that the two legs can reach. The above-mentioned joint information includes the position, the speed and the acceleration of each joint of the biped robot. The constraint conditions of the foot placement may be defined according to kinematics and dynamics of the biped robot such as the walking speed of the robot, because the instability of the robot and some postures cannot be reached will be caused if its walking speed is too fast. The constraint conditions of the foot placement may be set according to the actual application situation.

Therefore, after the candidate node set is generated, the nodes in the candidate node set that will collide with the obstacles in the global map will be removed, and only the valid candidate nodes will be added to the priority queue. It can be understood that, by combining the robot's own parameters and joint information as well as map environment information to determine the nodes to be searched, the number of nodes to be searched can be greatly reduced, thereby improving search efficiency.

Generally, it determines whether the priority queue is currently empty first, and if not, the cost value of all the candidate nodes in the priority queue will be calculated. In one embodiment, if it is determined that the priority queue is currently empty, the search is stopped.

For each candidate node in the priority queue, as an example, the cost value of each candidate node in the priority queue may be calculated through the cost evaluation function so as to take the candidate node with the smallest cost value as the optimal node to output. In which, the outputted optimal node will be used as the next foot placement of the current node for updating a foot placement sequence of the biped robot. Generally, after an optimal node is outputted from the priority queue, the outputted optimal node will be deleted from the priority queue.

S120: determining whether the output optimal node and a target node meet a preset distance condition, and returning to the generating the candidate node set for the next foot placement in response to the output optimal node and the target node not meeting the preset distance condition.

In order to determine whether the target node is reached or not, it is necessary to determine the optimal node for each output. In which, the above-mentioned preset distance condition may be that if the distance between the currently outputted optimal node and the target node is within the range of a preset distance which means that it is close enough to the target node, it will be determined that the preset distance condition is met. Otherwise, it will be determined that the preset distance condition is not met, which means that there is still a certain distance from the target node. Therefore, it will return to the above-mentioned step S110, that is, the expansion of the candidate nodes of the next foot placement and the selection of the optimal nodes will be continued at the current node, until the latest outputted optimal node is close enough to the target node.

S130: generating a sequence of foot placements according to the output optimal node so that the biped robot moves to the target node from an initial node according to the sequence of foot placements.

In one embodiment, the biped robot updates one foot placement sequence according to the optimal node output each time, thereby obtaining the foot placement sequence from the initial node to the target node. It can be understood that, the route composed of the foot placements in the global map is taken as the planned path. Thus, the biped robot may execute the task from the initial node to the target node according to the published foot placement sequence.

In this embodiment, when the biped robot path planning method searches for path nodes, it generates the candidate node set of the next foot placement based on the biped robot's joint information at the current node, own parameters, and environmental information, which can greatly reduce the search amount for the node when the left and right legs of the robot intersect and touch the ground, so as to improve the search efficiency.

Embodiment 2

Figure 4:
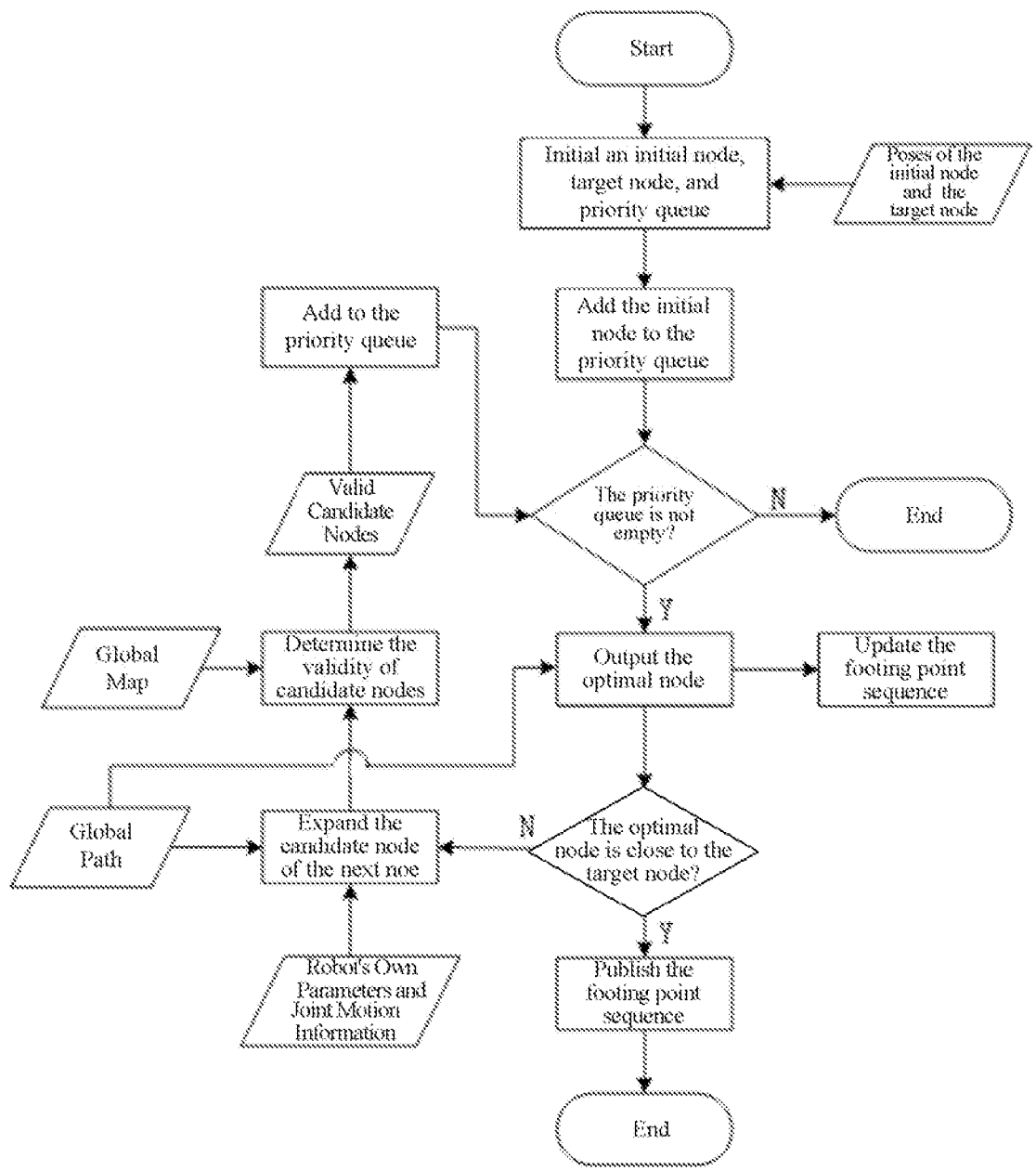
FIG. 4 is a flow chart of the third embodiment of a biped robot path planning method according to the present disclosure.

FIG. 4 is a flow chart of the third embodiment of a biped robot path planning method according to the present disclosure. Another path planning method is provided. Referring to FIG. 4, in this embodiment, this path planning method is difference from the path planning method in Embodiment 1 that it further optimizes the above-mentioned search process for path nodes through the global path, thereby accelerating the speed of path searching and further improving the efficiency of path planning.

In one embodiment, the method may further include: generating a global path from the initial node to the target node according to the received navigation information and a preset expansion radius of the biped robot using a preset path planning algorithm, where the global path is capable of for optimizing the above-mentioned cost evaluation function and/or reducing the number of the candidate nodes in the above-mentioned candidate node set.

In one embodiment, when generating the global path, the biped robot may be regarded as a centroid while has a large expansion radius. In this manner, a continuous path from the initial node to the target node which avoids obstacles may be quickly generated using the existing path planning algorithm such as the A* search algorithm for wheeled robots. In which, the expansion radius may be set based on the actual lateral size of the biped robot.

For the optimization process of path planning, taking the optimization of the above-mentioned cost evaluation function as an example, in one embodiment, the cost evaluation function may be optimized using the global path by: calculating the heuristic value of the candidate nodes in the priority queue using the global path.

In the A* search algorithm, the Euclidean distance between the candidate node and the target node is usually used as the heuristic value. In this embodiment, the global path is used to calculate the heuristic value of each candidate node. In this manner, the global path is used as the guiding path to guide the selection of the optimal node to the guiding direction where the global path is located, thereby further speeding up the search speed of sub-nodes.

Figure 5:
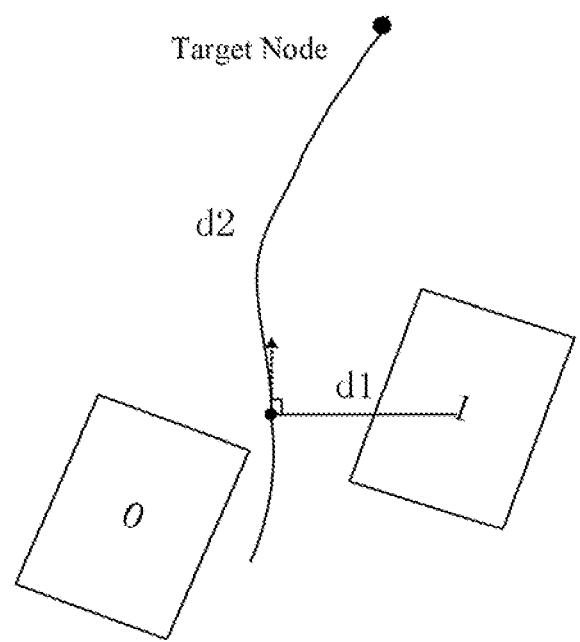
FIG. 5 is a schematic diagram of an example of calculating a heuristic value based on a global path in a biped robot path planning method of FIG. 4.

In one embodiment, the calculation of the heuristic value of the candidate node may start from the initial node to traverse the nodes on the global path. FIG. 5 is a schematic diagram of an example of calculating a heuristic value based on a global path in a biped robot path planning method of FIG. 4. As shown in FIG. 5, if a line between the candidate node on the global path and the current candidate node is perpendicular to a tangent direction of the candidate node on the global path, the length d1 of the line and the arc distance d2 from the candidate node to the target node on the global path is calculated. At this time, the heuristic value H of the current candidate node is the sum of the length d1 of the line and the arc distance d2.

Taking reducing the number of the candidate nodes in the candidate node set as an example, in the second embodiment, the number of the candidate nodes in the candidate node set may be reduced using the global path by: defining a first boundary and a second boundary on two sides of the global path based on body width information of the biped robot. Furthermore, the first boundary and the second boundary are combined to limit the expansion of the candidate node.

In one embodiment, taking the width of the body of the biped robot when standing with two legs as a reference, a preset width factor (usually greater than 1) of the width of the body may be adjusted so that the width from the first boundary to the second boundary slightly larger than the width of the body of the biped robot.

In one embodiment, for reducing the number of the candidate node set for the next foot placement that is generated based on the robot parameter(s) of the biped robot and the joint information of the current node, the candidate nodes in the candidate node set that are located without the first boundary and the second boundary may be removed.

Figure 6:
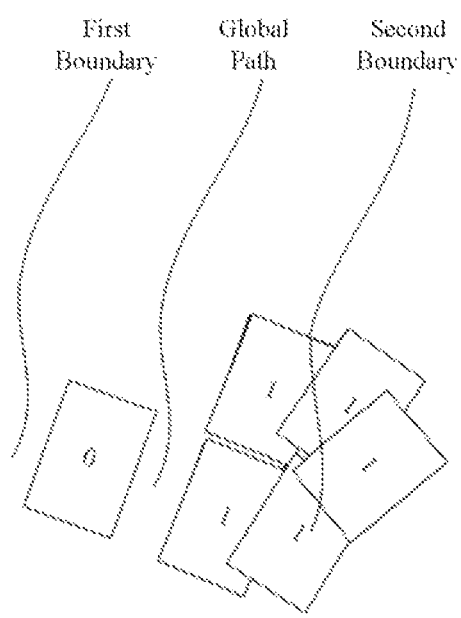
FIG. 6 is a schematic diagram of an example of reducing sub-nodes based on a global path in a biped robot path planning method of FIG. 4.

For example, after the candidate node set of the next foot placement is generated through the method of embodiment 1, it may determine whether each of the generated candidate nodes is located within the range of the first boundary and the second boundary. For the candidate node within the range of the two boundaries, it will be determined as a valid candidate node; otherwise, it will be regarded as an invalid candidate node and removed. FIG. 6 is a schematic diagram of an example of reducing sub-nodes based on a global path in a biped robot path planning method of FIG. 4. As shown in FIG. 6, because the center of the two candidate nodes on the far right are outside the range of the second boundary, they will be regarded as invalid candidate nodes.

It can be understood that, the first boundary and the second boundary at this time are used to remove the invalid nodes in the candidate node set after the candidate node set is calculated, which can reduce the number of the expansions of the next node.

In other embodiments, the first boundary and the second boundary may be used as the constraint conditions for calculating the candidate node set, that is, based on the biped robot's own parameters, joint information at the current node, and the constraint conditions, the candidate node set for the next foot placement may be generated.

For example, after obtaining the global path, the first boundary and the second boundary may be calculated based on the width information of the body of the biped robot. Furthermore, the position of the current foot placement of the biped robot and the first and second boundaries are combined to solve the footprint set of the next foot placement. Generally, one candidate node may include information such as the two-dimensional coordinates of the node in the global map and the angle of the robot when it touches the ground. For example, if the current node is located between the global path and one of the boundaries, for the next foot placement, the situation between the global path and the other of the boundaries may be considered, while the other candidate nodes whose two-dimensional coordinates exceed the other of the boundaries may not being calculated. It can be understood that, the first boundary and the second boundary at this time are used as the constraint conditions for calculating the candidate node set, thereby reducing the number of the candidate nodes generated, and further improving the search efficiency.

Generally, the generated candidate node information may include the two-dimensional coordinates of the candidate node in the global map and the angle of the biped robot when touching the ground, and can be denoted as, for example, (x, y, θ), where (x, y) are the two-dimensional coordinates of the candidate node, and θ is the angle.

Figure 7:
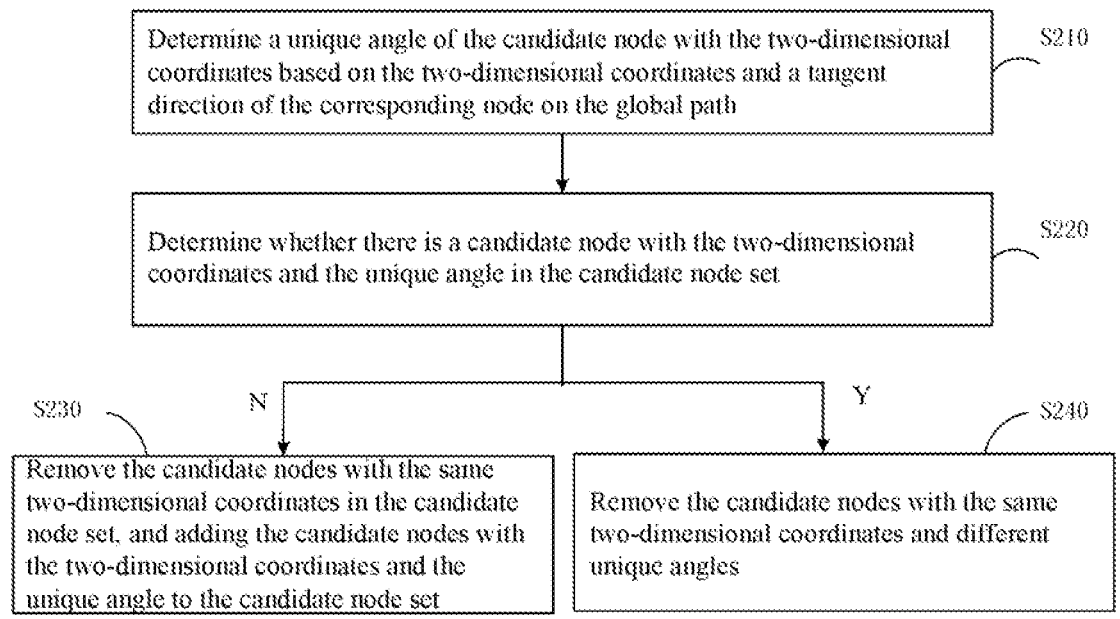
FIG. 7 is a flow chart of reducing sub-nodes based on a global path in a biped robot path planning method of FIG. 4.

FIG. 7 is a flow chart of reducing sub-nodes based on a global path in a biped robot path planning method of FIG. 4. In the third embodiment, as shown in FIG. 7, the number of the candidate nodes in the candidate node set may be reduced using the global path through the following steps.

S210: determining a unique angle of the candidate node with the two-dimensional coordinates based on the two-dimensional coordinates and a tangent direction of the corresponding node on the global path.

Generally, the footprint set includes a plurality of footprints. For the nodes with the same two-dimensional coordinates, the corresponding footprints will be different because the angles of the biped robot to touch the ground are different. At this time, dimensionality reduction may be achieved through the two-dimensional coordinates of the nodes and the global path.

Figure 8:
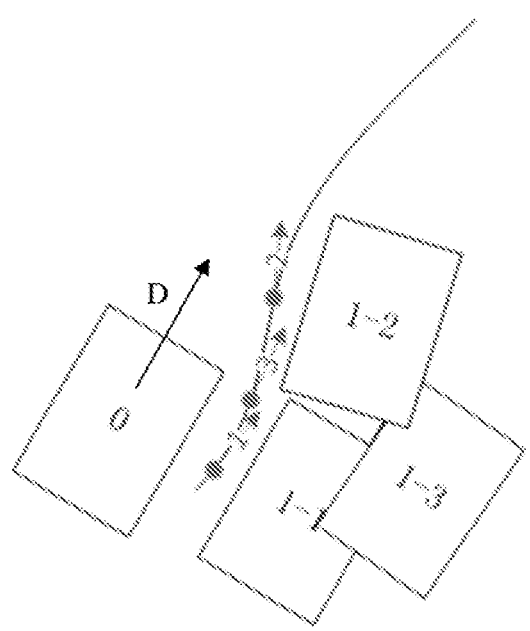
FIG. 8 is a schematic diagram of an example of reducing sub-nodes based on a global path in a biped robot path planning method of FIG. 4.

FIG. 8 is a schematic diagram of an example of reducing sub-nodes based on a global path in a biped robot path planning method of FIG. 4. As shown in FIG. 8, in one embodiment, 0 and 1 represent the supporting leg and the swinging leg, respectively. For the next foot placement 1, if the two-dimensional coordinates of one of the candidate nodes 1-1 are $(x_1, y_1)$, the unique angle of the candidate node may be calculated according to the tangent direction of the corresponding point on the global path. For example, the included angle between the tangent direction and the coordinate axis direction D may be taken as the unique angle $\theta_1$ (not shown) of the candidate node 1-1, and the unique candidate node $(x_1, y_1, \theta_1)$ with the two-dimensional coordinates $(x_1, y_1)$ can be obtained. Similarly, for the candidate nodes 1-2, candidate nodes 1-3 and the like, the candidate nodes $(x_2, y_2, \theta_2)$, $(x_3, y_3, \theta_3)$ and the like with the unique angle can be calculated, respectively.

S220: determining whether there is a candidate node with the two-dimensional coordinates and the unique angle in the candidate node set. If no, step S230 will be performed; otherwise, step S240 will be performed.

S230: removing the candidate nodes with the same two-dimensional coordinates in the candidate node set, and adding the candidate nodes with the two-dimensional coordinates and the unique angle to the candidate node set.

S240: removing the candidate nodes with the same two-dimensional coordinates and different unique angles.

Taking the above-mentioned candidate node 1-1 of the next foot placement 1 as an example, after solving the above-mentioned unique angle $\theta_1$, whether there is the candidate node $(x_1, y_1, \theta_1)$ in the candidate nodes in the candidate node set will be determined. If yes, the candidate node $(x_1, y_1, \theta_1)$ will be retained, while the candidate nodes with the two-dimensional coordinates $(x_1, y_1)$ and other angles are removed. Otherwise, the candidate node $(x_1, y_1, \theta_1)$ are added to the candidate node set, while the candidate nodes with the two-dimensional coordinates $(x_1, y_1)$ and other angle are removed. It can be understood that, when the dimensionality reduction is performed through the tangent direction of the node of the global path, for the candidate nodes with different two-dimensional coordinates, only one unique candidate node will be retained and added to the priority queue, and the number of sub-nodes will be greatly reduced.

It can be understood that, the above-mentioned schemes for optimizing using the global path may be used individually, or be used at the same time so as to jointly optimize from multiple aspects. In this embodiment, on the basis of searching the nodes using the footprint set, the global path is combined to speed up the searching of the path nodes, thereby improving the efficiency of path planning. It is worth noting that, although the global path generated by taking the biped robot as a centroid will underestimate the motion capability of the biped robot, the joint information of the biped robot can be taken into account by combining the footprint set to expand the sub-nodes, and the above-mentioned problems caused by the global path can therefore be improved.

Embodiment 3

Figure 9:
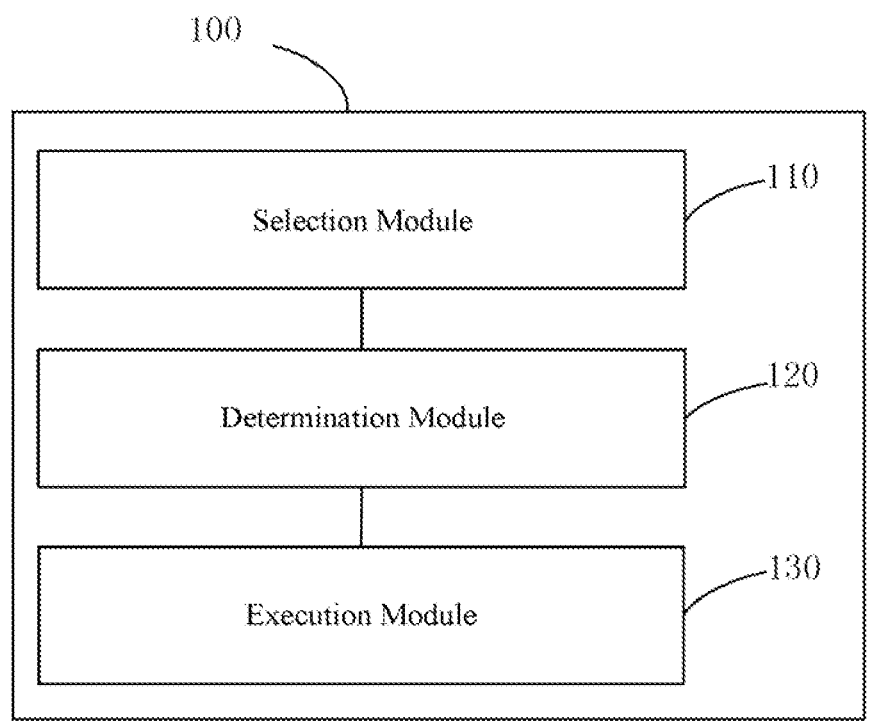
FIG. 9 is a schematic block diagram of a biped robot path planning apparatus according to an embodiment of the present disclosure.

FIG. 9 is a schematic block diagram of a biped robot path planning apparatus according to an embodiment of the present disclosure. Based on the method of embodiment 1, in this embodiment, a biped robot path planning apparatus 100 is provided, which may be applied to the above-mentioned biped robot. The biped robot path planning apparatus 100 may include:

a selection module 110 configured to generate a candidate node set for a next foot placement based on one or more robot parameters of the biped robot and joint information of a current node, add one or more valid candidate nodes not colliding with an obstacle in the candidate node set to a priority queue based on obstacle information, and calculate a cost value of each of the valid candidate nodes in the priority queue and taking the valid candidate node with the smallest cost value as an optimal node to output, where the priority queue is a data structure including cost values of the candidate nodes in the priority queue calculated using a cost evaluation function;

a determination module 120 configured to determine whether the output optimal node and a target node meet a preset distance condition, and return to the selection module to generate the candidate node set for the next foot placement in response to the output optimal node and the target node not meeting the preset distance condition; and an execution module 130 configured to generate a sequence of foot placements according to the output optimal node so that the biped robot moves to the target node from an initial node according to the sequence of foot placements.

Furthermore, the biped robot path planning apparatus 100 may further include a reception module.

The reception module is configured to receive navigation information, where the navigation information includes a global map for the biped robot, and the global map includes the above-mentioned obstacle information, the initial node, and the target node.

Furthermore, the biped robot path planning apparatus 100 may further include: a solution module and an optimization module. In which, the solution module is configured to generate a global path from the initial node to the target node according to the navigation information and a preset expansion radius of the biped robot using a preset path planning algorithm; and the optimization module is configured to use the global path to optimize the cost evaluation function and/or reduce the number of the candidate nodes in the candidate node set.

It can be understood that, in this embodiment, each module corresponds to each step of embodiment 1, and the optional features of embodiment 1 or 2 are also applicable to the biped robot path planning apparatus 100 of this embodiment, and the description will not be repeated herein.

In the embodiments of the present disclosure, a biped robot is further provided. In one embodiment, the biped robot includes a processor and a storage. The storage stores a computer program. When the computer program is executed on the processor, the above-mentioned the biped robot path planning method of embodiment 1 or embodiment 2 is implemented.

In the embodiments of the present disclosure, a non-transitory computer-readable storage medium is further provided, which stores a computer program. When the computer program is executed by a processor, the steps in the above-mentioned the biped robot path planning method of embodiment 1 or embodiment 2 or each module in the biped robot path planning apparatus 100 is implemented.

In the embodiments provided in the present disclosure, it should be understood that, the disclosed device (apparatus)s and method may also be implemented in other manners. The device embodiments described above are only schematic. For example, the flowcharts and schematic diagrams in the drawings show the possible architectures, functions, and operations according to the devices, methods, and computer program products of the embodiments of the present disclosure. In this regard, each block in the flowchart or block diagram may represent a module, program segment, or part of codes, and the module, program segment, or part of codes contains one or more executable instructions for realizing the specified logic functions. It should also be noted that, in alternative implementations, the functions marked in the blocks may also execute in a different order from the order marked in the drawings. For example, two consecutive blocks can actually be executed basically in parallel, or they can sometimes be executed in the reverse order, depending on the functions involved. It should also be noted that, each block in the schematic diagram and/or flowchart and the combination of the blocks in the schematic diagram and/or flowchart can be realized using a dedicated hardware-based system that executes specified functions or actions, or be realized using a combination of the dedicated hardware and computer instructions.

In addition, the functional modules or units in each embodiment of the present disclosure may be integrated together to form an independent part, or each module or unit may exist alone, or two or more modules or units may be integrated to form an independent part.

In the case that function(s) are implemented in the form of a software functional unit and sold or utilized as a separate product, they can be stored in a non-transitory computer readable storage medium. Based on this understanding, the technical solution of the present disclosure, either essentially or in part, contributes to the prior art, or a part of the technical solution can be embodied in the form of a software product. The software product is stored in a storage medium, which includes a plurality of instructions for enabling a computer device (which can be a smart phone, a personal computer, a server, a network device, or the like) to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes The forgoing is only the specific embodiment of the present disclosure, while the scope of the present disclosure is not limited thereto. For those skilled in the art, changes or replacements that can be easily conceived within the technical scope of the present disclosure should be included within the scope of the present disclosure.

What is claimed is:

1. A computer-implemented path planning method for a biped robot, comprising:

generating a candidate node set for a next foot placement based on one or more robot parameters of the biped robot and joint information of a current node;

adding one or more valid candidate nodes, not colliding with an obstacle, from the candidate node set to a priority queue based on obstacle information, and calculating a cost value of each of the valid candidate nodes in the priority queue and taking the valid candidate node with the smallest cost value as an optimal node to output;

determining whether the outputted optimal node and a target node meet a preset distance condition;

in response to the outputted optimal node and the target node not meeting the preset distance condition, returning to the step of generating the candidate node set for the next foot placement, to generate a candidate node set for a next foot placement of the outputted optimal node, until the outputted optimal node and the target node meet the preset distance condition; and in response to the outputted optimal node and the target node meeting the preset distance condition, generating a sequence of optimal output nodes to approach the target node according to all the outputted optimal nodes, and controlling the biped robot to move to the target node from an initial node according to the sequence of optimal output nodes to approach the target node;

wherein the priority queue is a data structure comprising cost values of the candidate nodes in the priority queue calculated using a cost evaluation function, and the cost values are sorted from small to large; and the method further comprises:

generating a global path from the initial node to the target node according to navigation information and a preset expansion radius of the biped robot using a preset path planning algorithm;

wherein the global path is for at least one of: optimizing the cost evaluation function, and reducing a number of the candidate nodes in the candidate node set;

wherein the cost evaluation function comprises: a heuristic value and a spent cost of each of the candidate nodes in the priority queue, the heuristic value refers to a predicted cost from a current candidate node in the priority queue to the target node, and the spent cost value refers to a spent cost from the initial node to the current candidate node;

wherein the cost evaluation function is optimized using the global path by calculating the heuristic value of each of the candidate nodes in the priority queue using the global path; and wherein the heuristic value of the current candidate node is calculated by:

traversing all nodes on the global path from the initial node to the target node; and in response to a line between a candidate node on the global path and the current candidate node being perpendicular to a tangent direction of the global path at the candidate node, calculating a length of the line, calculating a distance from the candidate node on the global path to the target node on the global path, calculating a sum of the length of the line and the distance, and taking the sum as the heuristic value of the current candidate node.

2. The method of claim 1, wherein before the generating the candidate node set for the next foot placement based on the one or more robot parameters of the biped robot and the joint information of the current node, the method comprises:

receiving the navigation information, wherein the navigation information comprises a global map for the biped robot, and the global map comprises the obstacle information, the initial node, and the target node.

3. The method of claim 2, wherein after the receiving the navigation information, the method further comprises:

adding the initial node to the priority queue as the first candidate node; and directly outputting the initial node, and returning to the generating the candidate node set for the next foot placement based on the one or more robot parameters of the biped robot and the joint information of the current node.

4. The method of claim 2, wherein the candidate node set comprises a plurality of footprints that can be reached by a current swinging leg of the biped robot, and each of the footprints is a candidate node for the next foot placement and corresponds to a node in the global map.

5. The method of claim 1, wherein the number of the candidate nodes in the candidate node set is reduced using the global path by:

defining a first boundary and a second boundary on two sides of the global path based on body width information of the biped robot; and taking the first boundary and the second boundary as constraint conditions, and generating the candidate node set of the next foot placement according to the one or more robot parameters of the biped robot, the joint information of the current node, and the constraint conditions.

6. The method of claim 1, wherein the number of the candidate nodes in the candidate node set is reduced using the global path by:

defining a first boundary and a second boundary on two sides of the global path based on body width information of the biped robot; and removing other candidate nodes except candidate nodes located between the first boundary and the second boundary, from the candidate node set.

7. The method of claim 1, wherein information of each of the candidate nodes in the candidate node set comprises two-dimensional coordinates of the candidate node in the global map and an angle of the biped robot when touching a ground; and wherein the number of the candidate nodes in the candidate node set is reduced using the global path by:

determining a unique angle of the candidate node with the two-dimensional coordinates based on the two-dimensional coordinates and a tangent direction of the global path at a corresponding node on the global path;

determining whether there is a candidate node with the two-dimensional coordinates and the determined unique angle in the candidate node set;

in response to there being no candidate node with the two-dimensional coordinates and the determined unique angle in the candidate node set, removing candidate nodes with the two-dimensional coordinates from the candidate node set, and adding the candidate node with the two-dimensional coordinates and the determined unique angle to the candidate node set; and in response to there being the candidate node with the two-dimensional coordinates and the determined unique angle in the candidate node set, removing candidate nodes with the two-dimensional coordinates and a different unique angle from the candidate node set, wherein the different unique angle is different from the determined unique angle.

8. The method of claim 1, wherein the preset distance condition comprises: a distance between the outputted optimal node and the target node being within a preset distance range.

9. The method of claim 1, wherein when generating the global path, the biped robot is modeled as a circle of a specified radius centered on a point, and the specified radius is set based on a lateral size of the biped robot.

10. A biped robot, comprising:

a processor;

a memory coupled to the processor; and one or more computer programs stored in the memory and executable on the processor;

wherein, the one or more computer programs comprise:

instructions for generating a candidate node set for a next foot placement based on one or more robot parameters of the biped robot and joint information of a current node;

instructions for adding one or more valid candidate nodes, not colliding with an obstacle, from the candidate node set to a priority queue based on obstacle information, and calculating a cost value of each of the valid candidate nodes in the priority queue and taking the valid candidate node with the smallest cost value as an optimal node to output;

instructions for determining whether the outputted optimal node and a target node meet a preset distance condition;

instructions for, in response to the outputted optimal node and the target node not meeting the preset distance condition, returning to the generating the candidate node set for the next foot placement to generate a candidate node set for a next foot placement of the outputted optimal node until the outputted optimal node and the target node meet the preset distance condition; and instructions for, in response to the outputted optimal node and the target node meeting the preset distance condition, generating a sequence of optimal output nodes to approach the target node according to all the outputted optimal nodes, and controlling the biped robot to move to the target node from an initial node according to the sequence of optimal output nodes to approach the target node;

wherein the priority queue is a data structure comprising cost values of the candidate nodes in the priority queue calculated using a cost evaluation function, and the cost values are sorted from small to large; and the one or more computer programs further comprise:
  instructions for generating a global path from the initial node to the target node according to navigation information and a preset expansion radius of the biped robot using a preset path planning algorithm;
  wherein the global path is for at least one of: optimizing the cost evaluation function, and reducing a number of the candidate nodes in the candidate node set;
  wherein the cost evaluation function comprises: a heuristic value and a spent cost of each of the candidate nodes in the priority queue, the heuristic value refers to a predicted cost from a current candidate node in the priority queue to the target node, and the spent cost value refers to a spent cost from the initial node to the current candidate node;
  wherein the cost evaluation function is optimized using the global path by calculating the heuristic value of each of the candidate nodes in the priority queue using the global path; and
  wherein the heuristic value of the current candidate node is calculated by:
    traversing all nodes on the global path from the initial node to the target node; and
    in response to a line between a candidate node on the global path and the current candidate node being perpendicular to a tangent direction of the global path at the candidate node, calculating a length of the line, calculating a distance from the candidate node on the global path to the target node on the global path, calculating a sum of the length of the line and the distance, and taking the sum as the heuristic value of the current candidate node.

11. The biped robot of claim 10, wherein the one or more computer programs further comprise:
  instructions for receiving the navigation information, wherein the navigation information comprises a global map for the biped robot, and the global map comprises the obstacle information, the initial node, and the target node.

12. The biped robot of claim 11, wherein the one or more computer programs further comprises:
  instructions for adding the initial node to the priority queue as the first candidate node; and
  instructions for directly outputting the initial node, and returning to the generating the candidate node set for the next foot placement based on the one or more robot parameters of the biped robot and the joint information of the current node.

13. The biped robot of claim 10, wherein the number of the candidate nodes in the candidate node set is reduced using the global path by:
  defining a first boundary and a second boundary on two sides of the global path based on body width information of the biped robot; and
  taking the first boundary and the second boundary as constraint conditions, and generating the candidate node set of the next foot placement according to the one or more robot parameters of the biped robot, the joint information of the current node, and the constraint conditions.

14. The biped robot of claim 10, wherein the number of the candidate nodes in the candidate node set is reduced using the global path by:
  defining a first boundary and a second boundary on two sides of the global path based on body width information of the biped robot; and
  removing other candidate nodes except candidate nodes located between the first boundary and the second boundary, from the candidate node set.

15. The biped robot of claim 10, wherein information of each of the candidate nodes in the candidate node set comprises two-dimensional coordinates of the candidate node in the global map and an angle of the biped robot when touching a ground; and
  wherein the number of the candidate nodes in the candidate node set is reduced using the global path by:
    determining a unique angle of the candidate node with the two-dimensional coordinates based on the two-dimensional coordinates and a tangent direction of the global path at a corresponding node on the global path;
    determining whether there is a candidate node with the two-dimensional coordinates and the determined unique angle in the candidate node set;
    in response to there being no candidate node with the two-dimensional coordinates and the determined unique angle in the candidate node set, removing candidate nodes with the two-dimensional coordinates from the candidate node set, and adding the candidate node with the two-dimensional coordinates and the determined unique angle to the candidate node set; and
    in response to there being the candidate node with the two-dimensional coordinates and the determined unique angle in the candidate node set, removing candidate nodes with the two-dimensional coordinates and a different unique angle from the candidate node set, wherein the different unique angle is different from the determined unique angle.

16. A non-transitory computer readable storage medium for storing one or more computer programs, wherein the one or more computer programs comprise:
  instructions for generating a candidate node set for a next foot placement based on one or more robot parameters of the biped robot and joint information of a current node;
  instructions for adding one or more valid candidate nodes, not colliding with an obstacle, from the candidate node set to a priority queue based on obstacle information, and calculating a cost value of each of the valid candidate nodes in the priority queue and taking the valid candidate node with the smallest cost value as an optimal node to output;

instructions for determining whether the outputted optimal node and a target node meet a preset distance condition;

instructions for, in response to the outputted optimal node and the target node not meeting the preset distance condition, returning to the generating the candidate node set for the next foot placement to generate a candidate node set for a next foot placement of the outputted optimal node until the outputted optimal node and the target node meet the preset distance condition; and instructions for, in response to the outputted optimal node and the target node meeting the preset distance condition, generating a sequence of optimal output nodes to approach the target node according to all the outputted optimal nodes, and controlling the biped robot to move to the target node from an initial node according to the sequence of optimal output nodes to approach the target node;

wherein the priority queue is a data structure comprising cost values of the candidate nodes in the priority queue calculated using a cost evaluation function, and the cost values are sorted from small to large; and the one or more computer programs further comprise:
instructions for generating a global path from the initial node to the target node according to navigation information and a preset expansion radius of the biped robot using a preset path planning algorithm;

wherein the global path is for at least one of: optimizing the cost evaluation function, and reducing a number of the candidate nodes in the candidate node set;

wherein the cost evaluation function comprises: a heuristic value and a spent cost of each of the candidate nodes in the priority queue, the heuristic value refers to a predicted cost from a current candidate node in the priority queue to the target node, and the spent cost value refers to a spent cost from the initial node to the current candidate node;

wherein the cost evaluation function is optimized using the global path by calculating the heuristic value of each of the candidate nodes in the priority queue using the global path; and wherein the heuristic value of the current candidate node is calculated by:
traversing all nodes on the global path from the initial node to the target node; and
in response to a line between a candidate node on the global path and the current candidate node being perpendicular to a tangent direction of the global path at the candidate node, calculating a length of the line, calculating a distance from the candidate node on the global path to the target node on the global path, calculating a sum of the length of the line and the distance, and taking the sum as the heuristic value of the current candidate node.

17. The storage medium of claim 16, wherein the one or more computer programs further comprise:
instructions for receiving the navigation information, wherein the navigation information comprises a global map for the biped robot, and the global map comprises the obstacle information, the initial node, and the target node.

18. The storage medium of claim 16, wherein the number of the candidate nodes in the candidate node set is reduced using the global path by:
defining a first boundary and a second boundary on two sides of the global path based on body width information of the biped robot; and
removing other candidate nodes except candidate nodes located between the first boundary and the second boundary, from the candidate node set.

* * * * *